United States Patent
Madsen (10) Patent No.: US 11,885,311 B2
(45) Date of Patent: Jan. 30, 2024

(54) LUBRICATION SYSTEM

(71) Applicant: Siemens Gamesa Renewable Energy A/S, Brande (DK)

(72) Inventor: Ulrich Hedegaard Madsen, Børkop (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/841,735

(22) Filed: Jun. 16, 2022

(65) Prior Publication Data

US 2022/0412322 A1    Dec. 29, 2022

(30) Foreign Application Priority Data

Jun. 24, 2021 (EP) .................................... 21181581

(51) Int. Cl.
*F03D 80/70* (2016.01)
*F16N 7/38* (2006.01)
*F16N 19/00* (2006.01)
*F16N 31/00* (2006.01)

(52) U.S. Cl.
CPC .............. *F03D 80/70* (2016.05); *F16N 7/38* (2013.01); *F16N 19/00* (2013.01); *F16N 31/00* (2013.01); *F05D 2260/98* (2013.01); *F16N 2210/025* (2013.01); *F16N 2210/14* (2013.01); *F16N 2270/22* (2013.01); *F16N 2280/00* (2013.01)

(58) Field of Classification Search
CPC ....... F01M 11/0458; F03D 80/70; F16N 7/38; F16N 19/00; F16N 31/00; F16N 2210/14; F16N 2280/00
See application file for complete search history.

(56) References Cited

U.S. PATENT DOCUMENTS

| | | | | |
|---|---|---|---|---|
| 2,320,048 | A * | 5/1943 | Parson | F16N 37/00 222/113 |
| 5,067,455 | A * | 11/1991 | Okajima | F01M 9/02 123/196 R |
| 5,853,068 | A * | 12/1998 | Dixon | F01M 11/045 141/331 |
| 5,964,318 | A * | 10/1999 | Boyle | F01M 11/12 123/196 S |
| 9,163,536 | B2 * | 10/2015 | Becker | F16N 39/06 |
| 9,638,167 | B2 * | 5/2017 | Schnetgoeke | F03D 80/70 |
| 10,294,837 | B2 * | 5/2019 | Bach | F01M 11/0458 |
| 10,619,533 | B2 * | 4/2020 | Barnes | F02D 41/26 |
| 11,255,233 | B2 * | 2/2022 | Sloan | F04B 49/20 |

(Continued)

FOREIGN PATENT DOCUMENTS

| | | |
|---|---|---|
| EP | 2503148 A1 | 9/2012 |
| EP | 3 388 666 A1 | 10/2018 |

(Continued)

*Primary Examiner* — Michael A Riegelman
(74) *Attorney, Agent, or Firm* — Schmeiser, Olsen & Watts LLP (57) ABSTRACT

A lubrication system for a wind turbine is provided, the lubrication system including a lubricant consumer to which fresh lubricant is supplied and out of which used lubricant is extracted, a pump for pumping fresh lubricant to the lubricant consumer, a waste lubricant collector where used lubricant can flow after being extracted from the lubricant consumer, and a plurality of containers delivering fresh lubricant to the lubrication system.

2 Claims, 4 Drawing Sheets (56) References Cited

U.S. PATENT DOCUMENTS

| | | | | |
|---|---|---|---|---|
| 11,639,771 | B2* | 5/2023 | Molla | F16N 31/00 184/7.4 |
| 11,662,059 | B2* | 5/2023 | Hove | F03D 80/00 184/4 |
| 2002/0023691 | A1* | 2/2002 | Capstran | F01M 11/0458 141/59 |
| 2010/0056315 | A1* | 3/2010 | Scholte-Wassink | F03D 80/50 700/282 |
| 2012/0243998 | A1* | 9/2012 | Becker | F16N 39/06 416/169 R |
| 2014/0044519 | A1* | 2/2014 | Schnetgoeke | F03D 7/00 415/182.1 |
| 2019/0136727 | A1* | 5/2019 | Lamb | F16H 57/045 |
| 2020/0049310 | A1* | 2/2020 | Lisby | F16N 29/02 |
| 2022/0412322 | A1* | 12/2022 | Madsen | F01M 11/0458 |

FOREIGN PATENT DOCUMENTS

| | | |
|---|---|---|
| EP | 3 388 668 A1 | 10/2018 |
| EP | 3 739 204 A1 | 11/2020 |

\* cited by examiner

LUBRICATION SYSTEM

CROSS-REFERENCE TO RELATED APPLICATIONS

This application claims priority to European Application No. 21181581.6, having a filing date of Jun. 24, 2021, the entire contents of which are hereby incorporated by reference.

FIELD OF TECHNOLOGY

The following relates to a lubrication system for a wind turbine. The following further relates to a method of lubricating a wind turbine by a lubrication system.

BACKGROUND

Wind turbines are increasingly used for the generation of electrical energy. A wind turbine comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

Wind turbines have several components that require lubrication, such as the drive train comprising the main bearing or the gearbox and the pitch bearings. Additionally, wind turbines are placed at locations providing high wind amounts. These locations are usually not easily reached, for example at offshore wind parks. Therefore, wind turbines need a lubrication system that provides ample lubrication at all times while at the same time extending the maintenance interval lengths so that the maintenance of the wind turbine is kept to a minimum, thereby reducing the service costs.

The bearings and other components of wind turbines cannot be manually lubricated on a regular basis due to the high costs of service for this procedure. Hence, such bearings are equipped with a lubrication system that includes a lubricant reservoir which is filled with lubricant, and which ensures that the bearings are continuously lubricated over an extended period. During the regular on-site service, the technician has to refill the lubricant reservoir. Such lubrication systems for wind turbines are known from the conventional art. EP 3 388 666 A1 and EP 3 388 668 A1 disclose lubrication systems comprising a main oil tank or a reservoir filled with lubrication liquid, with which the components of the wind turbine such as the drive train are lubricated.

Refilling generally occurs by lubricant containers. Conventionally, an external pump is used to pump the lubricant, in particular grease or oil, from the container into the lubricant reservoir, as disclosed in EP 3 739 204 A1. This procedure is very time-consuming and therefore expensive, as containers have to be brought to the pump to fill the reservoir. Additionally, the containers have to be regularly checked to see if they are empty. Especially for offshore wind turbines, the costs of maintenance of the lubrication system are very high, as containers have to be brought to the nacelle and the old containers have to be replaced by new ones before they run empty.

The use of a single tank or reservoir for lubricating the moving parts of wind turbines has the disadvantage that the wind turbine has to be locked from rotation when the tank is replaced, as there is no connection to the tank during this operation. Alternatively, the tank can be refilled, but the tank has to be cleaned on a regular basis so that old lubricant trapped or dried in the tank can be drained out of the tank so as not to obstruct the flow of fresh lubricant from the tank to the lubrication circuit. For the time when the tank is being filled, the wind turbine has to be locked from rotation. To clean the tank, it has to be transported offsite to a facility suited for this purpose, as doing the cleaning onsite risks the leakage of lubricant, which is an environmental hazard and very critical for offshore wind turbines. This means that the single tank, which usually has large dimensions to store enough lubricant for an extended period, has to be hoisted from the wind turbine to the ground, resulting in a complex and expensive process.

The current development of the technology of wind turbines tends to an increased size of wind turbines for harvesting more wind energy, with longer blades and higher towers. Due to the increasing size of wind turbines and the higher loads generated by the wind turbines, the components of the wind turbine needing lubrication such as the drive train or the pitch bearing have wider diameters as well to be able to transmit higher torques, requiring a higher amount of lubrication than smaller wind turbines.

The use of a single tank for the newly developed wind turbines with its increased size compared to older wind turbines is disadvantageous due to the large capacity of the tank needed to provide the rotating parts of the wind turbine with enough lubricant. The replacement of a single tank is more difficult and expensive hoisting technology is needed. Additionally, the arrangement of a single tank with a high capacity at the wind turbine is a difficult task due to the limited space available for components at the wind turbine.

SUMMARY

An aspect relates to a lubrication system for moving parts in wind turbines which overcomes the problems related to the supply and storage of lubrication known from the conventional art.

According to embodiments of the invention, a lubrication system for a wind turbine is provided. The lubrication system comprises a lubricant consumer to which fresh lubricant is supplied and out of which used lubricant is extracted, a pump for pumping fresh lubricant to the lubricant consumer, a waste lubricant collector where used lubricant can flow after being extracted from the lubricant consumer, and a plurality of containers delivering fresh lubricant to the lubrication system.

Hence, fresh lubricant is extracted from the containers and brought by the pump to the lubricant consumer, where it is used in rotating parts. After using the lubricant in the rotating parts of the lubricant consumer, the used lubricant is collected in a waste lubricant collector.

Fresh lubricant is therefore supplied to the system by a plurality of containers. The use of a plurality of containers allows a continuous supply of the necessary lubrication to the components of the wind turbine. During maintenance works, while a first container is being replaced or refilled, a second container of the plurality of containers can deliver the lubrication to the lubricant consumer without the need of stopping the operation of the wind turbine. Once the first container is replaced or filled with fresh lubricant, it can be connected again to the lubricant consumer. Hence, the operation of the wind turbine can be continued during maintenance works. This is advantageous from a service and cost perspective, as the risk of not being able to provide the lubrication system with fresh lubricant is minimized. Additionally, locking the system to avoid a rotation due to a disconnection from the lubricant supply greatly increases the fatigue of the components in the wind turbine.

The use of a plurality of containers instead of a single tank has the advantage that the containers can be hoisted more easily to the wind turbine and that the arrangement of the containers is easier, as the limited available space to store the containers can be used more efficiently.

The lubrication system components can be connected by pipes from the containers to the lubricant consumer and from the lubricant consumer to the waste lubricant collector. The lubricant can be distributed through different pipes of the pipe network by a distributor and filters can be installed to avoid dirt getting into the lubricant consumers.

According to an embodiment of the invention, the lubrication system further comprising an input valve for controlling the flow of fresh lubricant from the containers. Single input valves can be placed between groups of containers to control the flow of fresh lubricant from the groups or, alternatively, an input valve can be arranged for each container to control the flow of fresh lubricant from each container.

The input valves can be completely opened, allowing the highest flow rate from the container. Additionally, the input valves can be completely closed, thereby disconnecting the container from the lubrication system, and not allowing fresh lubricant to flow out of the container. Additionally, the input valves can have an intermediate position between the open and the close position to regulate the flow coming out of the container.

According to an embodiment of the invention, the lubrication system further comprises an output valve for controlling the flow of used lubricant in the waste lubricant collector. The output valve can be a manually operated valve which is opened by an operator when a container or a can is to be filled with used lubricant.

According to another embodiment of the invention, a control unit controls the flow through the input valve. In particular, the control unit sends signals to the input valves to open or close them. Additionally, the control unit can monitor the flow of lubricant from the containers. The control unit can be the main control unit of the wind turbine, which monitors the condition of the wind turbine and collects statistics on the operation of the wind turbine. Alternatively, the lubrication system can comprise a control unit.

According to another embodiment of the invention, the control unit is configured to monitor how long the fresh lubricant was stored in the different containers, by keeping track of the time when the containers were refilled or replaced.

Hence, a monitoring system of the control unit keeps track of the time when a given container was refilled or replaced in the lubrication system, thereby ensuring which input valves of which containers to open in accordance with this time record keeping. This ensures that the input valves of the containers comprising older fresh lubricant, i.e., fresh lubricant in a container that has been stored for an extended period compared to the fresh lubricant of other containers, are opened first, and therefore the older fresh lubricant is used before opening the input valves of the containers comprising newer fresh lubricant. As the lubricant deteriorates over time, by using first the lubricant stored for a longer time, this ensures that the lubricant is not wasted, as otherwise deteriorated lubricant stored over a long period of time in a container has to be disposed without being able to use it. Using deteriorated lubricant in rotating components might result in a component damage as well, as the properties of the lubricant change over time and the lubrication efficiency decreases.

Therefore, it is advantageous to have a plurality of containers due to easier storage and better control of lubricant degradation over time. It is therefore preferable to have a lubrication system comprising several smaller containers rather than one single big tank, wherein with the term big it is meant the size of the tank compared to the size of smaller containers. Additionally, although a single bigger tank is able to supply the lubrication system for an extended period of time, a negative effect of having a single tank is that the lubricant starts to degrade in the tank due to the extended time the tank is used. Smaller containers connected to a common supply pipe have the older lubricant replace continuously and minimize the risk of degradation of lubricant.

The containers can be plastic containers or steel drums.

According to another embodiment of the invention, the containers are detachable for allowing a replacement of empty containers with containers filled with fresh lubricant. This is advantageous during maintenance works to easily replace the containers.

Additionally, having detachable containers is advantageous over stationary tanks, as the containers have to be cleaned on a regular basis so that old lubricant trapped or dried in the tank can be drained out of the tank so as not to obstruct the flow of fresh lubricant from the tank to the lubrication circuit. By having detachable containers, the containers can be taken out of the wind turbine to a cleaning facility and cleaned and filled containers can replaced the used containers.

According to another embodiment of the invention, the containers are fillable for allowing a refill with fresh lubricant. In an embodiment, the containers can be both fillable and detachable, so that the containers can be easily filled before running empty without needing to replace the containers and during maintenance works requiring the cleaning of the containers, the containers can be detached.

Additionally, having fillable containers being configured to be filled with fresh lubricant allows to fill containers which are partly empty, but not completely empty, thereby maximizing the use of the available lubricant and delaying the next maintenance, as the containers can be filled at a later point before running empty due to the refilling.

If the containers are only partly empty and the containers are not fillable, the service worker might decide whether to replace the container, thereby wasting the fresh lubricant in the container, or to leave the container installed, thereby lowering the time length when the next maintenance has to be conducted, as less lubricant is available in the lubrication system, thereby requiring that a maintenance is done in a shorter time to fill the system with fresh lubricant.

According to another embodiment of the invention, at least two of the containers are connected in parallel. Having a parallel connection of containers allows for an independent connection of the containers with the lubricant consumer. It is advantageous to have a separate input valve for each parallel connection of containers.

According to another embodiment of the invention, at least two of the containers are connected in series. Hence, the fresh lubricant of the first container is used before using the fresh lubricant of the second container. This allows for a cost-effective arrangement of containers, as the same input valve can be used to control the flow of a group of containers connected in series.

According to another embodiment of the invention, a plurality of parallelly connected container groups comprise a plurality of containers arranged in series. In an embodiment, an input valve controls each group of parallelly connected containers.

According to another embodiment of the invention, the lubricant consumer is at least a component of the drive train of the wind turbine, in particular a main bearing. The lubricant consumer can also be the gearbox or the complete drive train. The main bearing can be a roller bearing or a fluid film bearing. Similarly, other parts of the wind turbine, such as the pitch bearing or the yaw bearing, can be the lubricant consumer.

If different components need different lubrication types, in particular a grease-based lubricant or a liquid lubricant, a plurality of lubrication systems can be arranged individually.

Similarly, the waste lubricant collector is dimensioned to collect the volume of the waste lubricant exiting the lubricant consumers. Such waste lubricant collector can be designed to collect all types of the lubricants used jointly. Alternatively, the types of lubricants used can be separately collected by the same waste lubricant collector or by different waste lubricant collectors to recycle and recover the lubricants.

According to another embodiment of the invention, the waste lubricant collector is a sump. This is advantageous to easily collect the used lubricant exiting the lubricant consumer.

According to another embodiment of the invention, a removable can or a removable tank is connected to the sump. A removable can or a removable tank is an easy way of collecting the waste lubricant in a closed recipient which can be detached of the lubricant system and be transported away from the wind turbine. The overall capacity of the removable can be designed with a capacity that matches the lubricant consumption for a certain period of time to be able to plan the maintenance intervals accordingly.

According to an embodiment of the invention, at least one of the containers is connected to the waste lubricant collector, to the sump, after being emptied from the fresh lubricant. Hence, the empty containers are coupled to the waste lubricant collector and filled with used lubricant. Once the containers are full, they can be decoupled from the lubrication system and brought to a lubricant recycling plant offsite. This measure reduces the materials and transportation costs, as empty containers are not transported right away from the wind turbine when used but are used to collect used lubricant. Hence, the containers are used to bring fresh lubricant to the lubrication system and once emptied from fresh lubricant, they are used to collect used lubricant and bring the used lubricant out of the wind turbine.

According to another embodiment of the invention, the lubrication system further comprises sensors to monitor the fill level of the containers and/or of the waste lubricant collector. The sensors can measure the weight of the container to compute the fill level. Alternatively, the sensor can comprise electrodes, which when immersed in a conductive lubricant close a circuit, thereby monitoring the fill level of lubricant in the container. A wide variety of sensors known in the conventional art capable of measuring the fill level in containers can be used.

The lubrication system can be designed as a retrofit solution to existing lubricant systems connected to a lubricant consumer such as a rotating component, i.e., a lubricant system already in use comprising the necessary filters, lubricant distribution network, pumps, and the waste lubricant collector. Hence, the two or more containers connected in series or parallel can be coupled to an existing lubricant system to benefit from the advantages of embodiments of the invention.

Yet another aspect of embodiments of the invention relates to a method of lubricating a wind turbine by a lubrication system, the lubrication system comprising a lubricant consumer to which fresh lubricant is supplied and out of which used lubricant is extracted, a pump for pumping fresh lubricant to the lubricant consumer, a waste lubricant collector where used lubricant can flow after being extracted from the lubricant consumer, a plurality of containers delivering fresh lubricant to the lubrication system, input valves for controlling the flow from the containers and a control unit for controlling the flow through the input valves, the method comprising the steps of connecting a first container of the plurality of containers being filled with fresh lubricant to the lubricant consumer and having a second container of the plurality of containers being filled with fresh lubricant disconnected from the lubricant consumer, extracting fresh lubricant from the first container by the pump, monitoring if the first container is empty and/or monitoring the filling level of the first container, and connecting the second container to the lubricant consumer when the first container is empty or when the filling level of the first container is lower than a predefined value.

According to another aspect of embodiments of the invention, the method further comprises the step of monitoring how long the fresh lubricant is stored in the different containers by keeping track of the time when the containers were refilled or replaced.

According to another aspect of embodiments of the invention, the method further comprises the step of connecting the containers to the lubricant consumer according to the time when the containers were refilled or replaced in such a way that containers comprising fresh lubricant stored for a longer time are connected first.

BRIEF DESCRIPTION

Some of the embodiments will be described in detail, with reference to the following figures, wherein like designations denote like members, wherein.

DETAILED DESCRIPTION

Figure 1:
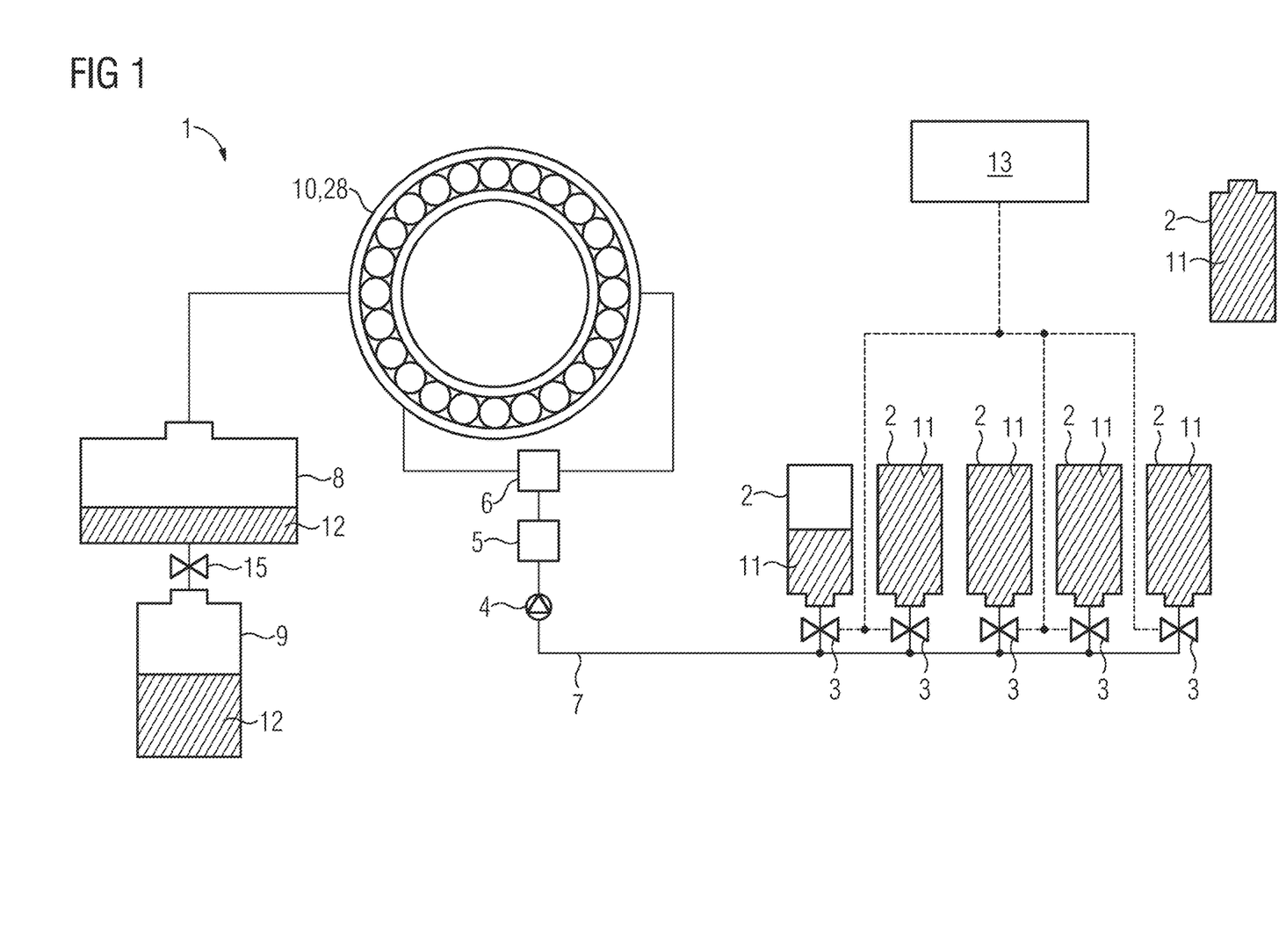
FIG. 1 shows a lubrication system according to a first embodiment of the invention providing lubricant from a plurality of containers to a roller bearing.

FIG. 1 shows a lubrication system 1 according to a first embodiment of the invention providing lubricant from a plurality of containers 2 to a roller bearing 28.

Hence, the lubricant consumer 10 is the roller bearing 28, which can be the main bearing 28 of the wind turbine 20. A pump 4 extracts the fresh lubricant 11 from the containers 2 and brings it to the lubricant consumer 10. A filter 5 is added to filter impurities of the fresh lubricant 11 and avoiding that dirt reaches the lubricant consumer 10. A distributor 6 distributes the fresh lubricant 11 through pipes 7 to be able to reach the lubricant consumer 10 at different points and have an efficient lubrication.

Used lubricant 12 is extracted from the lubricant consumer 10 and collected in a waste lubricant collector, in this case a sump 8. To be able to empty the sump 8 more easily, the sump is connected to a removable can 9 which can be detached and brought out of the wind turbine 20. For this, an output valve 15 between the sump 8 and the can 9 is closed to avoid spillage of used lubricant 12. The output valve 15 is a manually operated valve which is opened by an operator when the can 9 is to be filled with used lubricant 12.

Alternatively, it is possible to connect containers 2 to the sump 8 when they are empty. This measure reduces the transportation costs, as empty containers 2 are not transported right away from the wind turbine 20 when used but are used to collect used lubricant 12.

Four containers 2 are coupled to the lubrication system 1 parallelly. By input valves 3, each container 2 can be opened and closed. In this case, the first of the containers 2 is opened and the container 2 is partly empty of fresh lubricant 11, as it is being used for lubricating the lubricant consumer 10. The other containers 2 are not connected to the lubricant consumer 10 and their input valves 3 are closed. A control unit 13 controls the opening, closing and flow rate of the input valves 3 and thereby controls which containers 2 are emptied first, which are usually the containers 2 comprising the older fresh lubricant 11. Hence, the control unit 13 subsequently and automatically opens the next container 2 when the container 2 connected to the lubricant consumer 10 is empty or is about to become empty.

The containers 2 are detachable, thereby allowing a replacement of an empty container 2 with a container 2 filled with fresh lubricant 11, as shown in the upper right corner of the figure.

Figure 2:
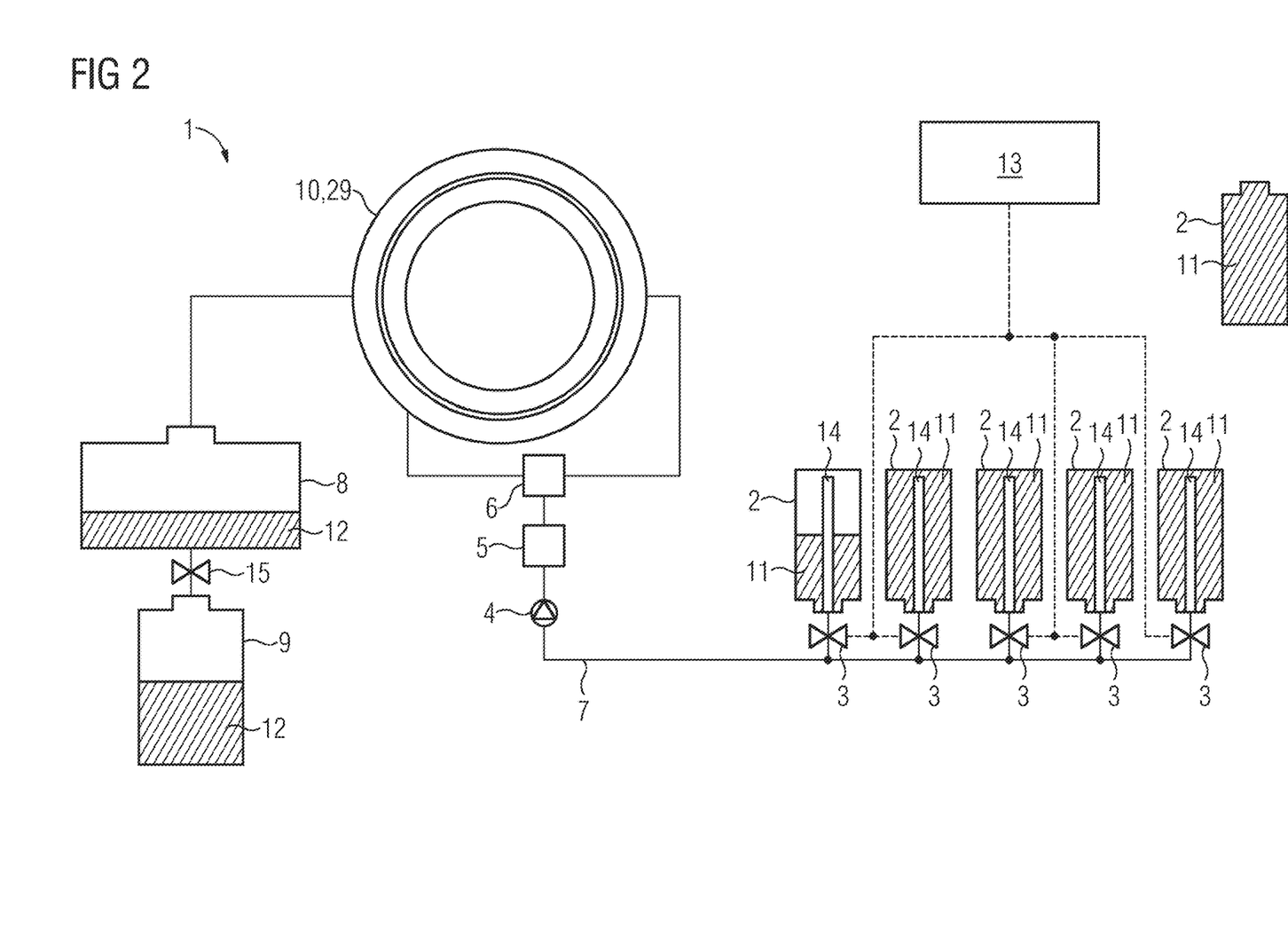
FIG. 2 shows a lubrication system according to a second embodiment of the invention providing lubricant from a plurality of containers to a hydrodynamic bearing.

FIG. 2 shows a lubrication system 1 according to a second embodiment of the invention providing lubricant from a plurality of containers 2 to a hydrodynamic bearing 29. The setup is similar to the one shown in FIG. 1. However, the lubrication system 1 shown here comprises sensors 14 to monitor the fill level of the containers 2.

Figure 3:
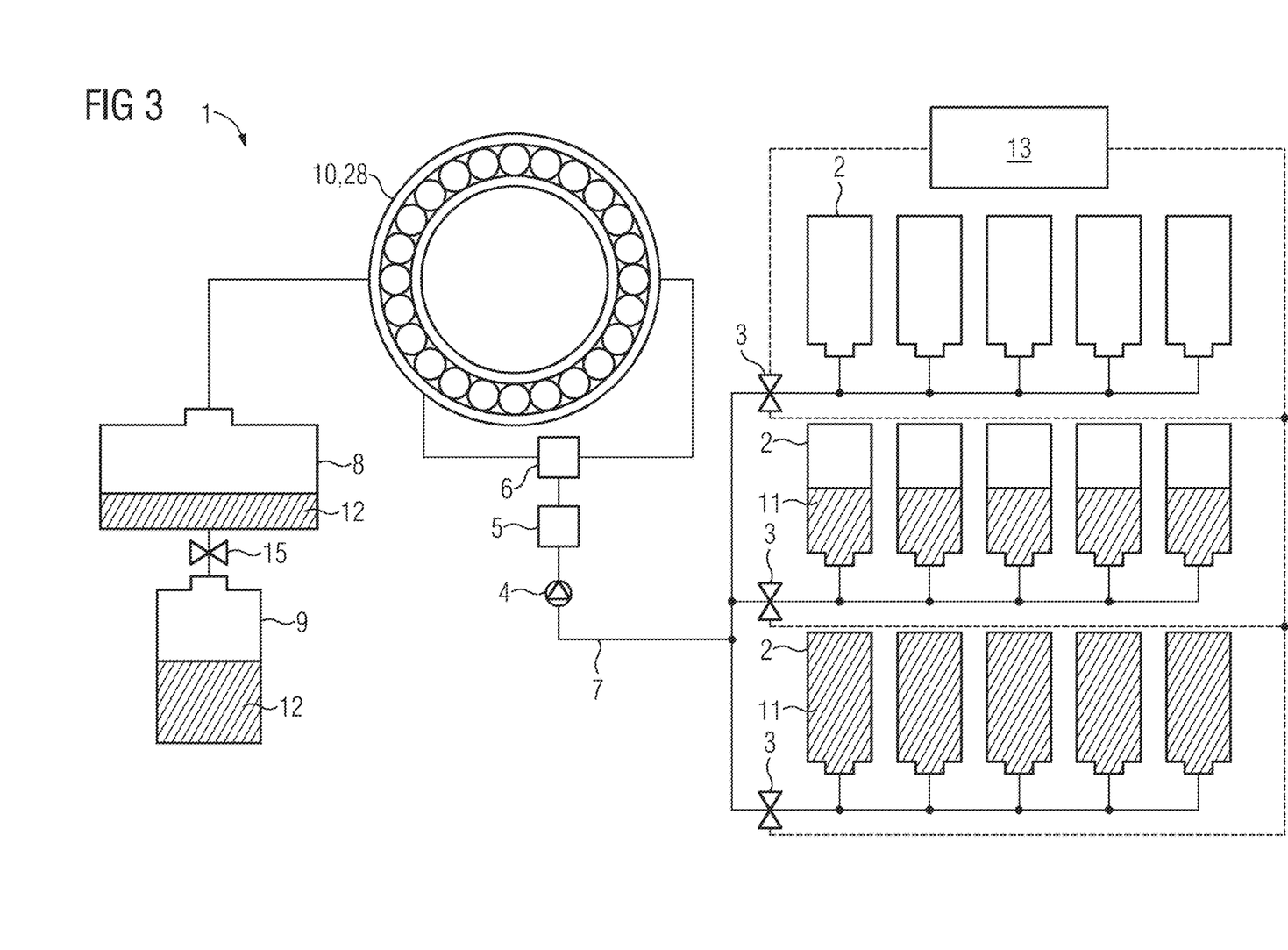
FIG. 3 shows a lubrication system according to a third embodiment of the invention providing lubricant from a plurality of containers to a roller bearing.

FIG. 3 shows a lubrication system 1 according to a third embodiment of the invention providing lubricant from a plurality of containers 2 to a roller bearing 28. The containers 2 are arranged in three parallelly coupled groups, each group comprising five serially connected containers 2. One input valve 3 is arranged to control the flow of each group of five containers 2, wherein the input valves 3 are controlled by the control unit 13. In this figure, the upper group of containers 2 is empty, the middle group of containers 2 is currently connected to the lubricant consumer 10 and the lower group of containers 2 is disconnected from the lubricant consumer 10. Having a single input valve 3 for a group of serially connected containers 12 reduces the costs of the lubrication system 1. However, the containers 2 within the group will be emptied jointly.

Figure 4:
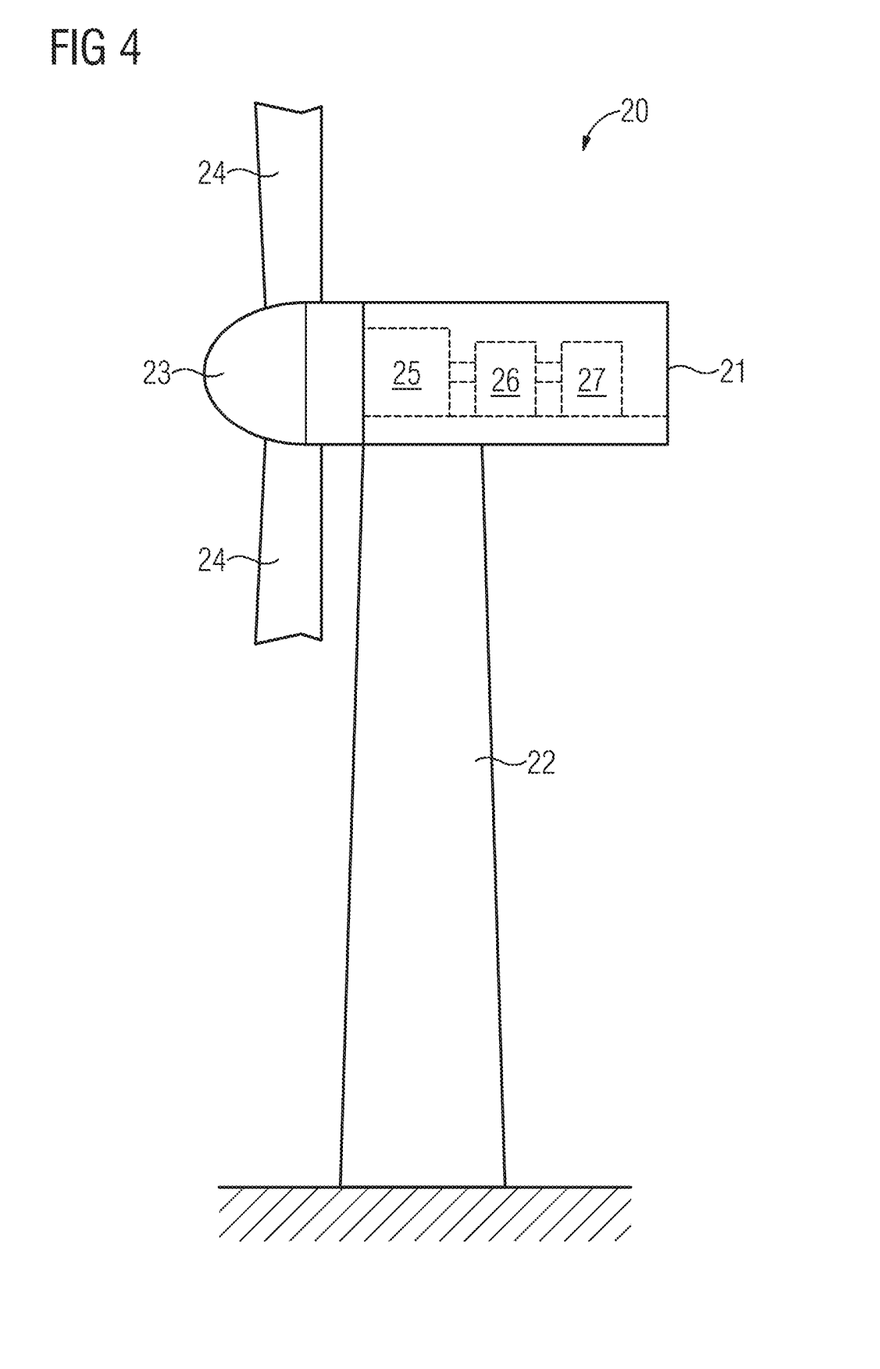
FIG. 4 shows a schematic view of a wind turbine.

FIG. 4 shows a schematic view of a wind turbine 20. The wind turbine 20 comprises a tower 22 on top of which a nacelle 21 is rotatably mounted. The wind turbine 20 further comprises a hub 23 which is connected to the nacelle 21. A plurality of blades 24 are mounted on the hub 23. The wind turbine 20 further comprises a drive train comprising a main bearing 25, a gearbox 26, and a generator 27.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE LIST

1 Lubrication system
2 Container
3 Input valve
4 Pump
5 Filter
6 Distributor
7 Pipe
8 Sump
9 Can
10 Lubricant consumer
11 Fresh lubricant
12 Used lubricant
13 Control unit
14 Sensor
15 Output valve
20 Wind turbine
21 Nacelle
22 Tower
23 Hub
24 Blades
25 Main bearing
26 Gearbox
27 Generator
28 Roller bearing
29 Hydrodynamic bearing

The invention claimed is:

1. A method of lubricating a wind turbine by a lubrication system, the lubrication system comprising a lubricant consumer to which fresh lubricant is supplied and out of which used lubricant is extracted, a pump for pumping fresh lubricant to the lubricant consumer, a waste lubricant collector where used lubricant can flow after being extracted from the lubricant consumer, a plurality of containers delivering fresh lubricant to the lubrication system, input valves for controlling the flow from the containers and a control unit for controlling the flow through the input valves, the method comprising:
  connecting a first container of the plurality of containers being filled with fresh lubricant to the lubricant consumer and having a second container of the plurality of containers being filled with fresh lubricant disconnected from the lubricant consumer;
  extracting fresh lubricant from the first container by the pump;
  monitoring if the first container is empty and/or monitoring the filling level of the first container; and
  connecting the second container to the lubricant consumer when the first container is empty or when the filling level of the first container is lower than a predefined value,
  wherein the method further includes monitoring how long the fresh lubricant is stored in the different containers by keeping track of the time when the containers were refilled or replaced and connecting the containers to the lubricant consumer according to the time when the containers were refilled or replaced in such a way that containers containing fresh lubricant stored for a longer time are connected first.

2. A method of lubricating a wind turbine, comprising:
providing a lubrication system having a lubricant consumer to which fresh lubricant is supplied and out of which used lubricant is extracted, a pump for pumping fresh lubricant to the lubricant consumer, a waste lubricant collector where used lubricant can flow after being extracted from the lubricant consumer, a plurality of containers delivering fresh lubricant to the lubrication system, input valves for controlling the flow from the containers, and a control unit for controlling the flow through the input valves;
connecting a first container of the plurality of containers being filled with fresh lubricant to the lubricant consumer and having a second container of the plurality of containers being filled with fresh lubricant disconnected from the lubricant consumer;
extracting fresh lubricant from the first container by the pump;
monitoring if the first container is empty and/or monitoring the filling level of the first container;
monitoring how long the fresh lubricant is stored in the different containers by keeping track of the time when the containers were refilled or replaced; and
connecting the second container to the lubricant consumer when the first container is empty or when the filling level of the first container is lower than a predefined value, wherein the second container is connected to the lubricant consumer according to the time when the containers were refilled or replaced such that containers containing fresh lubricant stored for a longer time are connected first.

* * * * *